United States Patent [19]

Fujiwara

[11] Patent Number: 5,343,836
[45] Date of Patent: Sep. 6, 1994

[54] DRIVE MECHANISM OF ENGINE IGNITION SYSTEM

[75] Inventor: Hiroshi Fujiwara, Katsuta, Japan

[73] Assignees: Hitachi, Ltd., Tokyo; Hitachi Automotive Engineering, Katsuta, both of Japan

[21] Appl. No.: 107,582

[22] Filed: Aug. 18, 1993

[30] Foreign Application Priority Data

Sep. 24, 1992 [JP] Japan .................................. 4-254556

[51] Int. Cl.⁵ ........................ F02P 7/10; F16H 55/06
[52] U.S. Cl. ............................................. 123/146.5 A
[58] Field of Search ................................ 123/146.5 A

[56] References Cited

U.S. PATENT DOCUMENTS 3,662,726  5/1972  Haskew et al. ............. 123/146.5 A
5,088,459  2/1992  Kunimitsu ................... 123/146.5 A

FOREIGN PATENT DOCUMENTS 51-27814   8/1976  Japan .
57-86566   5/1982  Japan .
59-63367   4/1984  Japan .
0126074    7/1984  Japan ............................ 123/146.5 A
0290056   12/1991  Japan .

*Primary Examiner*—David A. Okonsky
*Attorney, Agent, or Firm*—Antonelli, Terry, Stout & Kraus

[57] ABSTRACT

A drive mechanism of an engine ignition system has a housing fixed to an engine and a driven shaft of the engine ignition system rotatably supported by the housing. An engine provides a driving force for rotating a drive shaft, the rotation of which is transmitted to the driven shaft through screw gears having axes crossing each other. A screw gear provided on the driven shaft includes a main gear fixed to the driven shaft and an auxiliary gear opposed to an end face of the housing and rotatably and axially movably mounted on the driven shaft. The respective teeth of the main gear and auxiliary gear is staggered from each other when the main gear and auxiliary gear come in contact with each other. A resilient member is provided between the end face of the housing and the auxiliary gear. The screw gear on the drive shaft is adapted to push the auxiliary gear against the resilient force of the resilient member toward the end face of the housing so that the screw gears on the drive and driven shafts are engaged with each other. A sliding member may be provided between the end face of the housing and the auxiliary gear to be biased by the resilient member to come in direct or indirect contact with the end face of the housing, thereby causing sliding resistance of rotation.

6 Claims, 3 Drawing Sheets

DRIVE MECHANISM OF ENGINE IGNITION SYSTEM

BACKGROUND OF THE INVENTION

The present invention relates to a drive mechanism for an ignition distributor, a crank angle sensor, etc. used in the ignition system of an engine. In particular, the present invention relates to a drive mechanism using a screw gear as a power transmission system.

In the ignition distributor, the crank angle sensor, etc., the rotation of a crank shaft of the engine is transmitted to a rotating shaft of each of the ignition distributor and the crank angle sensor through a screw gear. A backlash of the screw gear of this kind tends to be structurally increased for reasons of manufacture of the screw gear.

An angular acceleration of a crank shaft or a drive shaft of the engine is generated by fluctuations of rotation caused by an explosion in cylinders, etc. The rotating shaft which is a driven shaft has a rotational inertia. Therefore, tooth faces of the drive and driven shafts come into collision with each other by the above backlash, so that an ignition timing becomes unstable and noises, abrasion and damages are involved with respect to the screw gears.

For example, Japanese Patent Examined Publication No. 51-27814 and Japanese Patent unexamined Publication No. 3-290059 (U.S. Pat. No. 5,088,459) disclose techniques for solving these problems. In these documents, a screw gear on a driven shaft comprises a main gear fixed to the driven shaft and an auxiliary gear rotatably and slidably fitted on the driven shaft. While the main and auxiliary gears are staggered from each other by an amount corresponding to backlash, a resilient spring force is applied to the auxiliary gear in a rotational direction thereof. Thus, teeth of a screw gear on the side of a drive shaft are caught by teeth of the main and auxiliary gears therebetween to remove the backlash.

In Japanese Patent Examined Publication No. 60-24311 and Japanese Patent Unexamined Publication No. 59-63367, a sliding plate adapted to rotate with a driven shaft is biassed against an end face of a housing, by resilient spring force which housing supports this driven shaft. Thus, rotational friction force is produced on the driven shaft to increase rotational torque of the driven shaft, so that self-propelling of a driven shaft system caused by its rotational moment is restrained.

Between the above measures to counter backlash, the former one is disadvantageous in that contact pressure between screw gears becomes great since a spring force (a spring force for biasing an auxiliary gear in a direction of rotation) required for removing backlash must be made great as an angular acceleration of a drive shaft and a rotational inertia of a driven shaft become great.

The latter one naturally has a limit because a spring force is made great to increase surface pressures (friction force of rotator) on contact faces, thus involving a problem such as abrasion of screw gears and parts which generate friction forces.

SUMMARY OF THE INVENTION

In consideration of the above-mentioned problems, an object of the present invention is to provide a drive mechanism of an engine ignition system which is reasonable and simplified to enable accommodating an angular acceleration and a rotational inertia greater than those in the conventional backlash removing means without losing durability of the drive mechanism.

The above object of the present invention can be achieved by a drive mechanism of an engine ignition system having a housing fixed to an engine, and a driven shaft of the engine ignition system rotatably supported by the housing, said engine providing a driving force for rotating a drive shaft, the rotation of which is transmitted to the driven shaft through screw gears having axes crossing each other, said driving mechanism further comprising a screw gear provided on said driven shaft and having a main gear fixed to said driven shaft and an auxiliary gear opposed to an end face of said housing and rotatably and axially movably mounted on said driven shaft, the respective teeth of said main and auxiliary gears being staggered from each other when the main and auxiliary gears come in contact with each other, and a resilient member provided between the end face of said housing and said auxiliary gear, said screw gear on said drive shaft pushing said auxiliary gear against the resilient force of said resilient member toward the end face of said housing so that the screw gears on said drive and driven shafts are engaged with each other.

DESCRIPTION OF THE PREFERRED EMBODIMENTS

The preferred embodiments of a drive mechanism of an engine ignition system in the present invention will next be described in detail with reference to the accompanying drawings.

Figure 1:
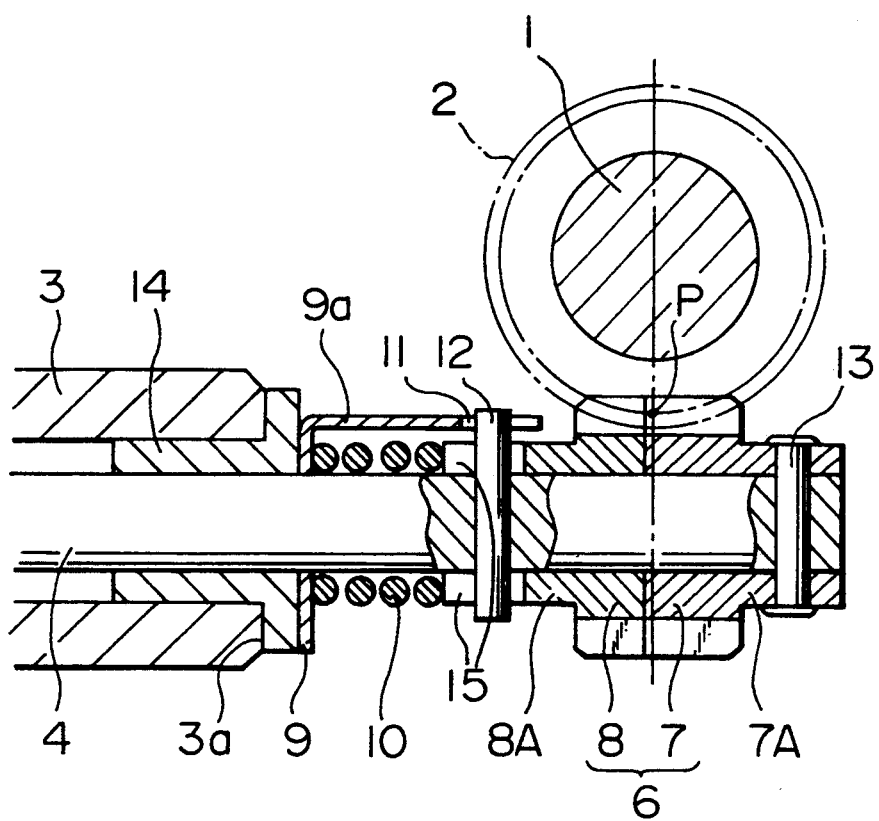
FIG. 1 is a cross-sectional view showing a main portion of a drive mechanism of an engine ignition system in accordance with a first embodiment of the present invention.
Figure 2:
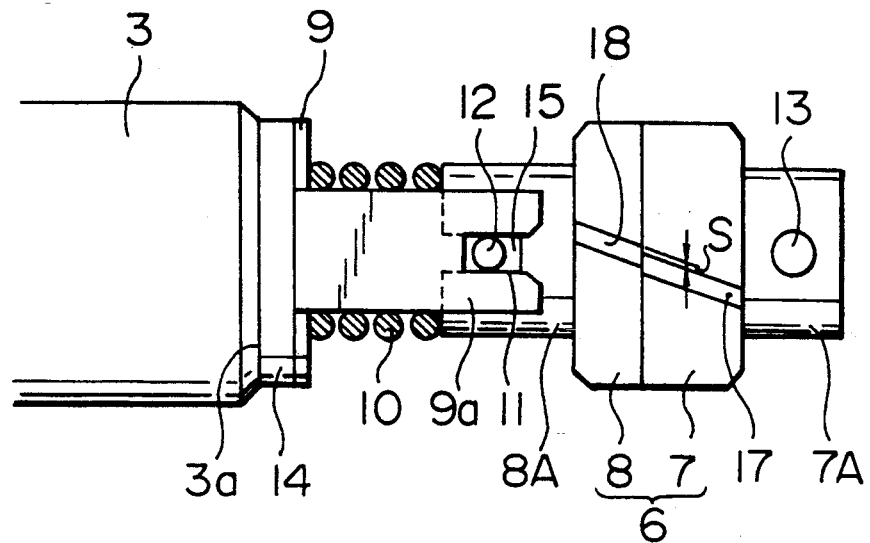
FIG. 2 is a view showing an appearance of the drive mechanism shown in FIG. 1.
Figure 3:
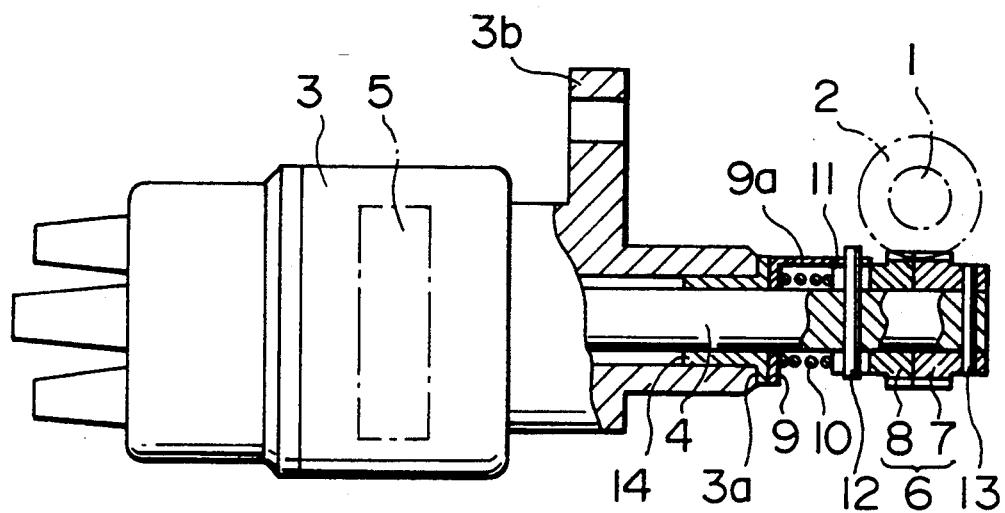
FIG. 3 is a view showing an entire construction of the drive mechanism in the first embodiment.

FIGS. 1 to 3 show an ignition distributor, which builds therein an ignition signal generator, in an engine ignition system in accordance with a first embodiment of the present invention. In FIG. 3, a housing 3 of the distributor is fixed to an engine (not shown) by fastening thereto a flange 3b by bolts, etc. A shaft 4 of the engine ignition system is inserted into the housing 3 and is journaled by a plain bearing 14 to drivingly rotate a signal rotor of an ignition signal generator 5 built in the housing 3. The plain bearing 14 is press-fitted in and fixed to one end 3a of the housing.

The rotation of a crank shaft 1 of the engine is transmitted to the shaft 4 through screw gears 2 and 6 having axes crossing each other at a predetermined angle.

A screw gear system and a backlash removing means in this embodiment will next be described in detail with reference to FIGS. 1 and 2.

A screw gear 2 on a drive side of the screw gear system is fixed to one end of the crank shaft 1. A screw gear 6 provided on the shaft 4 on a driven side of the screw gear system comprises a main gear 7 and an auxiliary gear 8. As shown in FIG. 1, the main gear 7 is fixed to the shaft 4 such that its one end face toward the auxiliary gear 8 is located in the vicinity of an engaging point P of the screw gear 6 and the screw gear 2 on a drive shaft side. The main gear 7 is fixed to the shaft 4 by riveting a sleeve 7A formed with the main gear 7 to the shaft 4 by a rivet 13.

The auxiliary gear 8 is loosely fitted on the shaft 4 in a manner to face the housing end face 3a, and is formed at its one end with a sleeve 8A. Slits or guide grooves 15 are formed in this sleeve 8A in a thrust direction and are engaged with a pin 12 which is press-fitted and fixed to the shaft 4. Thus, the auxiliary gear 8 can be rotated together with the shaft 4 and can be guided along the slit 15 to be moved in the thrust direction. As shown in FIG. 2, teeth 17 and 18 of the main gear 7 and the auxiliary gear 8 are staggered from each other by a distance or stagger S when the opposite end faces of the main gear 7 and the auxiliary gear 8 come in contact with each other. Such stagger S contributes to causing a thrust force to be applied to the auxiliary gear 8 so as to move the gear toward the housing 3 when the screw gear 2 on the drive side is engaged with the main gear 7 and the auxiliary gear 8.

A compression spring 10 and a sliding plate 9 mounted on the shaft 4 are arranged between the auxiliary gear 8 and the housing end face 3a. The sliding plate 9 comes in indirect contact with the housing end face 3a by the resilient force of the compression spring 10 through the plain bearing 14. The sliding plate 9 is formed integral with a sleeve 9a which has a slit 11 extending in the thrust direction. This slit 11 is positioned to align with the above slit 15 in the auxiliary gear 8 and to engage with the pin 12 so that the sliding plate 9 can rotate with the shaft 4 to cause sliding resistance of rotation.

An operation of the drive mechanism in the first embodiment of the present invention will next be described. When the screw gear 2 on the crank shaft 1 is engaged with the screw gear 6 on the shaft 4 which comprises the main gear 7 and the auxiliary gear 8, the auxiliary gear 8 on the shaft 4 is pushed against the resilient force of the compression spring 10 in a direction in which the stagger between the main gear 7 and the auxiliary gear 8 is reduced. This direction is a thrust direction directed toward the housing 3. Thus, the resilient force of the compression spring 10 is constantly applied to the auxiliary gear 8. Accordingly, one tooth face of the auxiliary gear 8 which is opposed to a face of the main gear 7 coming in contact with the screw gear 2 comes in contact with the screw gear 2 on the crank shaft 1.

As a result, the auxiliary gear 8 accommodates and removes a backlash of the screw gears 2 and 6.

When the auxiliary gear 8 is pushed by the screw gear 2 of the drive shaft as mentioned above, the resilient force of the compression spring 10 is applied toward the housing end face 3a to push the sliding plate 9 toward the plain bearing 14, thereby causing a contact face pressure of therebetween. Thus, frictional force of rotation is generated due to friction coefficients of contact portions of the sliding plate 9 and the plain bearing 14 when the shaft 4 is rotated. Accordingly, when the sliding plate 9 is rotated together with the screw gear 6 on the driven shaft, sliding resistance is produced which can reduce the rotational inertia of the driven shaft 4 and the screw gear 6 as a whole.

In this first embodiment, the auxiliary gear 8, the spring 10 and the sliding plate 9 are mechanically associated with one another in a manner to provide two functions in which a frictional force of rotation is generated on the side of the driven shaft 4 and a backlash of the screw gears 2 and 6 is removed. Thus such reasonable and simplified mechanism can adequately mitigate a collision between the screw gears caused by the backlash. Each of a sliding resistance and a pressure on teeth franks required to mitigate this collision can be reduced by half in comparison with a conventional single function of each of a backlash removing system, a sliding resistance system, etc. In other words, if the sliding resistance and the pressure on teeth franks are equal to those in the conventional case, the drive mechanism can accommodate two times an angular acceleration or rotational inertia of a rotator in the conventional case. In the first embodiment, the spring or resilient member 10 can serve as removing the backlash and generating the sliding resistance, so that the number of parts can be reduced and the drive mechanism can be made reasonable and simplified.

Figure 4:
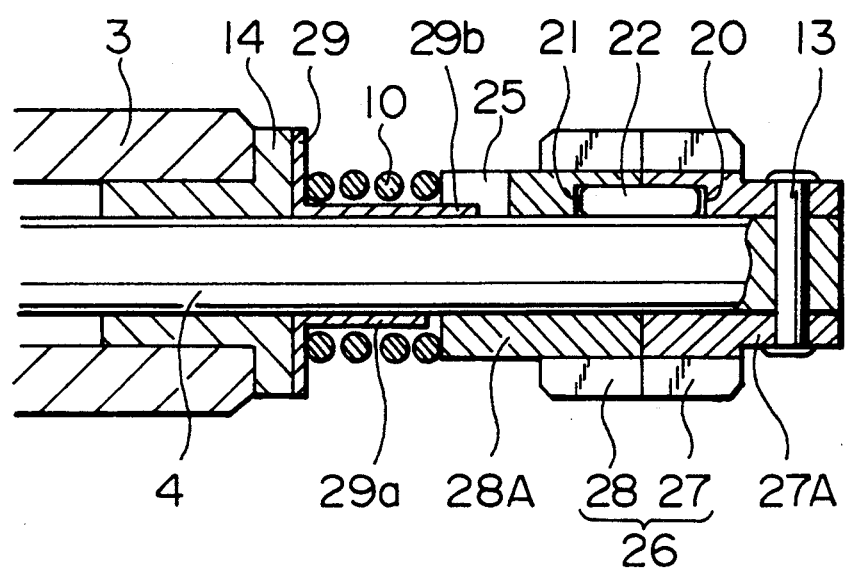
FIG. 4 is a cross-sectional view showing a main portion of a drive mechanism of an engine ignition system in accordance with a second embodiment of the present invention.

A drive mechanism of an engine ignition system in accordance with a second embodiment of the present invention will next be described with reference to FIG. 4. In FIG. 4, the same reference numerals as in the first embodiment respectively designate the same or common constructional elements.

The second embodiment is different from the first embodiment in a binding structure of a sliding plate 29, a main gear 27 and an auxiliary gear 28.

Namely, in the second embodiment, guide pin receiving grooves 20 and 21 respectively extend along inner peripheries of the main gear 27 and the auxiliary gear 28 on the shaft 4 in a thrust direction. A guide pin 22 is placed to connect the guide pin receiving grooves 20 and 21 to each other. Thus auxiliary gear 28 is engaged with the main gear 27 to enable rotating with the main gear 27 and the shaft 4 and moving on the shaft 4 in the thrust direction. A sleeve 29a is formed integral with the sliding plate 29 and is adapted to be fitted on the shaft 4 with a compression spring 10 arranged about the outer periphery thereof. A projection 29b is formed on the sleeve 29a and is adapted to be engaged with a slit 25 formed in a sleeve 28A of the auxiliary gear 28. The other constructional portions are similar to those in the first embodiment.

Like the first embodiment, the auxiliary gear 28 in this second embodiment accommodates the backlash of the screw gear 2 on the drive shaft 1 and the sliding plate 29 produces sliding resistance. Accordingly, effects similar to those in the first embodiment can be obtained in this second embodiment. Further, it is possible in the second embodiment to dispense with the processing work of an attachment hole for attaching the guide pin 12 to the shaft 4 in the first embodiment and a press fitting work of the guide pin, so that the drive mechanism can be simply assembled.

As mentioned above, in accordance with the present invention, the auxiliary gear, resilient member and the sliding plate are mechanically associated with one another to provide a drive mechanism of an engine ignition system which is reasonable and simplified to enable accommodating an angular acceleration and a rotational inertia greater than those in the conventional backlash removing means without losing durability of the drive mechanism.

What is claimed is:

1. In a drive mechanism of an engine ignition system having
   a housing fixed to an engine, and
   a driven shaft of the engine ignition system rotatably supported by the housing, said engine providing a driving force for rotating a drive shaft, the rotation of which is transmitted to the driven shaft through screw gears having axes crossing each other, the improvement comprising
   a screw gear provided on said driven shaft and having a main gear fixed to said driven shaft and an auxiliary gear opposed to an end face of said housing and rotatably and axially movably mounted on said driven shaft, the respective teeth of said main and auxiliary gears being staggered from each other when the main and auxiliary gears come in contact with each other; and
   a resilient member provided between the end face of said housing and said auxiliary gear; said screw gear on said drive shaft pushing said auxiliary gear against the resilient force of said resilient member toward the end face of said housing so that the screw gears on said drive and driven shafts are engaged with each other.

2. A drive mechanism of an engine ignition system as claimed in claim 1, further comprising a sliding member provided between said housing end face and said auxiliary gear, said sliding member being adapted to be pressed by said resilient member to comes in direct or indirect contact with said housing end face, thereby causing sliding resistance of rotation.

3. A drive mechanism of an engine ignition system as claimed in claim 2, wherein said auxiliary gear is formed at its one end with a sleeve having a slit, said sliding member is formed with a projecting piece having a slit which is adapted to align with the slit of said auxiliary gear, and both the slits are engaged with a pin fixed to said driven shaft so that said auxiliary gear and said sliding member can be rotated together with said driven shaft.

4. A drive mechanism of an engine ignition system as claimed in claim 2, wherein said auxiliary gear is adapted to axially movably engage with said main gear to rotate together with said main gear; and
   said sliding member is adapted to engage with said auxiliary gear to rotate together with said auxiliary gear.

5. A drive mechanism of an engine ignition system as claimed in claim 4, wherein each of said auxiliary gear and main gear is formed at the inner periphery with a groove which receives a pin, said auxiliary gear formed at its one end with a sleeve having a slit, and
   said sliding member is formed with a projecting piece which is adapted to be received by the slit of said auxiliary gear.

6. A drive mechanism of an engine ignition system as claimed in one of claims 2 to 5, wherein said resilient member comprises a compression spring.

* * * * *